US008307118B2

(12) United States Patent
Prasad et al.

(10) Patent No.: US 8,307,118 B2
(45) Date of Patent: Nov. 6, 2012

(54) ARCHITECTURE, SYSTEM AND METHOD FOR AN RTP STREAMING SYSTEM

(75) Inventors: Vikas K. Prasad, Bangalore (IN); Karthikeyan Natesan, Bangalore (IN); Sudheer Kumar Vootla, Bangalore (IN); Srikanth Nori, Bangalore (IN)

(73) Assignee: Ittiam Systems (P) Ltd., Bangalore, Kamataka (IN)

( * ) Notice: Subject to any disclaimer, the term of this patent is extended or adjusted under 35 U.S.C. 154(b) by 558 days.

(21) Appl. No.: 12/018,801

(22) Filed: Jan. 24, 2008

(65) Prior Publication Data

US 2009/0193135 A1 Jul. 30, 2009

(51) Int. Cl.
*G06F 15/16* (2006.01)

(52) U.S. Cl. ........................................ 709/246; 709/217

(58) Field of Classification Search .................. 709/217, 709/220, 227, 246
See application file for complete search history.

(56) References Cited

U.S. PATENT DOCUMENTS

| | | | | |
|---|---|---|---|---|
| 6,909,708 | B1 * | 6/2005 | Krishnaswamy et al. | 370/352 |
| 2005/0160152 | A1 * | 7/2005 | Selin et al. | 709/217 |
| 2006/0109856 | A1 * | 5/2006 | Deshpande | 370/412 |
| 2007/0268887 | A1 * | 11/2007 | Schwartz | 370/352 |
| 2009/0016333 | A1 * | 1/2009 | Wang et al. | 370/389 |

OTHER PUBLICATIONS

Title: Advance RTP/RTCP Toolkit for transferring real-time media over UDP/IP Author: Radvision Date: Sep. 2007 Pertinent pp. 1-4.*

Title: Component-based design and integration of a distributed multimedia management system Authors: Shu-Ching Chen; Mei-Ling Shyu; Na Zhao; Chengcui Zhang; Comput. Sci. Sch., Florida Int. Univ., Miami, FL. This paper appears in: Information Reuse and Integration, 2003. IRI 2003. IEEE International Conference on Issue Date: Oct. 27-29, 2003.*

* cited by examiner

*Primary Examiner* — Joseph Avellino
*Assistant Examiner* — Marshall McLeod
(74) *Attorney, Agent, or Firm* — Prakash Nama; Global IP Services, PLLC

(57) ABSTRACT

An architecture, system and method for an RTP streaming system is disclosed. In one embodiment, a method includes developing multiple standalone modules, developing application programming interfaces associated with the standalone modules, and tying together the standalone modules to form a subsystem associated with a streaming application and with a network. The method further includes integrating standalone modules including an RTP module, an RTCP module and a payload interface, associated with any one of a server mode and a client mode. The method also includes managing a streaming session associated with media streams via an RTPSS manager, adding the media streams to a stream manager. For each media stream of the streaming session: the method includes performing packetization services in the server mode and de-packetization services in the client mode, and performing server-mode related services in the server mode and client-mode related services in the client mode.

15 Claims, 8 Drawing Sheets

START
602 DEVELOP MULTIPLE STANDALONE MODULES
604 DEVELOP APPLICATION PROGRAMMING INTERFACES ASSOCIATED WITH THE STANDALONE MODULES
606 TIE TOGETHER THE STANDALONE MODULES TO FORM A SUBSYSTEM ASSOCIATED WITH A STREAMING APPLICATION AND ASSOCIATED WITH A NETWORK
608 INTEGRATE STANDALONE MODULES ASSOCIATED WITH A SERVER MODE AND SELECTED FROM THE GROUP CONSISTING ESSENTIALLY OF AN RTP MODULE, AN RTCP MODULE, AND A PAYLOAD INTERFACE
610 MANAGE, VIA AN RTPSS MANAGER, A STREAMING SESSION ASSOCIATED WITH MEDIA STREAMS
612 ADD, TO A STREAM MANAGER, THE MEDIA STREAMS
614 ADD, VIA THE PAYLOAD INTERFACE, PAYLOAD SPECIFIC HEADERS TO MEDIA DATA OF THE MEDIA STREAM AND ADD, VIA THE RTP MODULE, RTP HEADERS TO THE MEDIA DATA TO FORM RTP PACKETS, IF AN ENCODING FORMAT OF THE MEDIA STREAM IS SUPPORTED BY THE SUBSYSTEM
616 RECEIVE MEDIA DATA OF THE MEDIA STREAM HAVING ASSOCIATED PAYLOAD SPECIFIC HEADERS AND ADD, VIA THE RTP MODULE, RTP HEADERS TO THE MEDIA DATA TO FORM RTP PACKETS, IF THE ENCODING FORMAT OF THE MEDIA STEAM IS NOT SUPPORTED BY THE SUBSYSTEM
618 SEND THE RTP PACKETS DIRECTLY OVER THE NETWORK
A

ARCHITECTURE, SYSTEM AND METHOD FOR AN RTP STREAMING SYSTEM

FIELD OF TECHNOLOGY

The present invention relates to multimedia systems, and more specifically to a modular, reusable, configurable and extensible architecture for an RTP streaming system.

BACKGROUND

Multimedia are media that utilize a combination of different content forms. Multimedia entertainment systems and communication devices may be associated with a variety of multimedia applications. Some examples include IP Video Phones (IPVPs), streaming server/client, network audio player, and Video on Demand (VoD) service.

Multimedia applications often have common functionality. Related components may include, for example, network streaming components such as Real-time Transport Protocol (RTP), an RTP control Protocol (RTCP), Audio/Video/Speech packetization modules, and Adaptive Jitter Buffer (AJB).

Due to the common functionality of components or modules across applications, there is a vested interest in reusing the common components or modules rather than incurring time, effort and cost expenditures associated with re-development for each multimedia application. In addition, system software written during integration may also have reusable aspects.

One of the possible approaches to reusability is development of common modules as independent modules with a generic Application Programming Interface (API). System designers may then select the independent components needed for a particular system.

This approach, however, requires a detailed knowledge on the part of a system designer of each of the independent modules as well as the knowledge necessary to tie the independent modules together to build a complete system (application). There may be a substantial time investment to customize each independent module for a given application and increased complexities and challenges for the system designers. The foregoing may increase the time to market for completed systems and may result in cost-prohibitive systems and lost market share.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

An architecture, system and method for an RTP streaming system is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
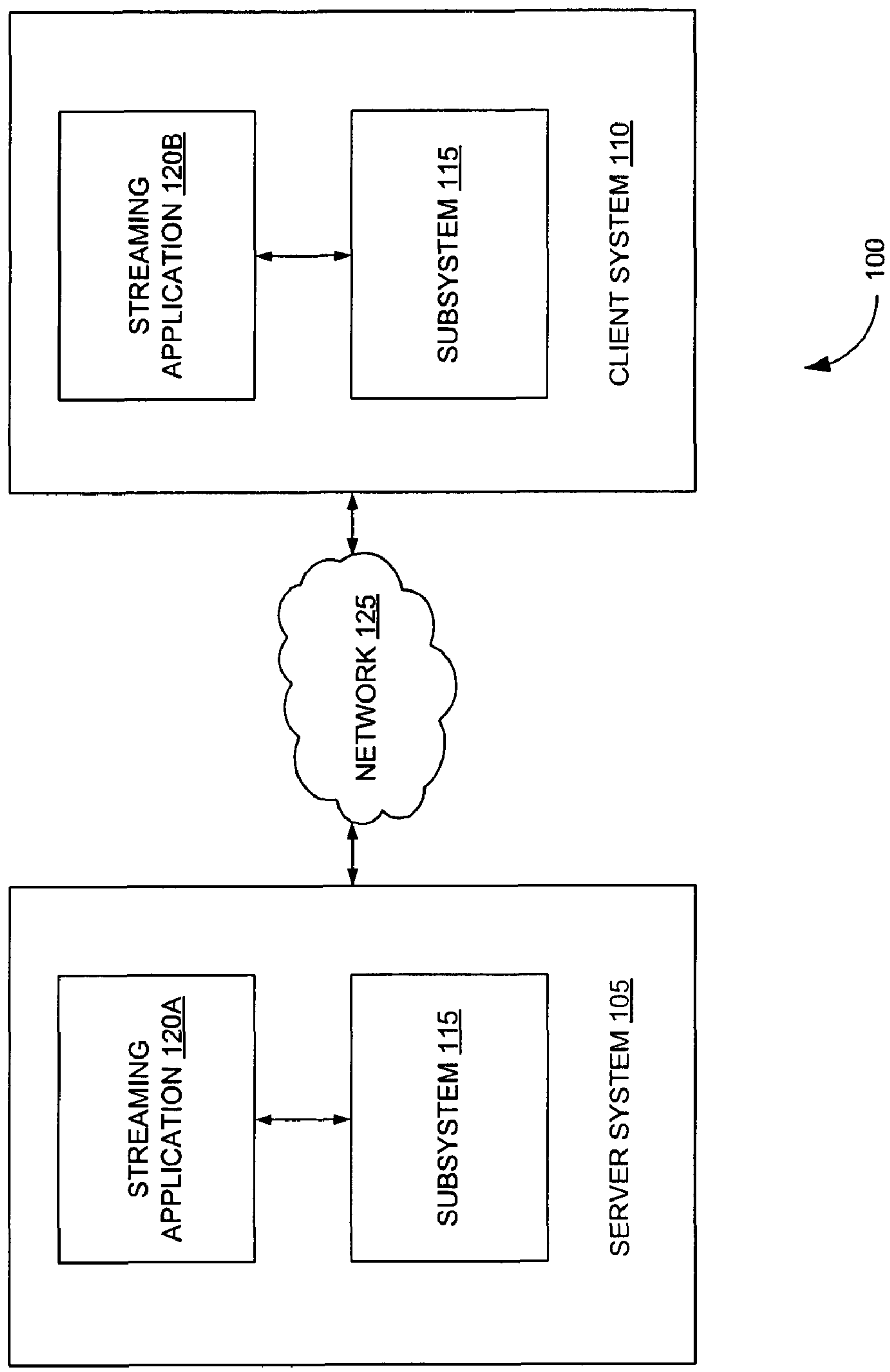
FIG. 1 illustrates a multimedia environment including a subsystem associated with a streaming application, according to one embodiment.

FIG. 1 illustrates a multimedia environment 100 including a subsystem 115 associated with a streaming application 120, according to one embodiment. Particularly, FIG. 1 illustrates a server system 105, a client system 110, the subsystem 115 associated with the server system 105 and the client system 110 respectively, the streaming applications 120A-B and a network 125.

The server system 105 refers to a specialized server that uses a real-time transfer protocol (RTP), an RTP control protocol (RTCP), etc. to stream media streams (e.g., audio, video, images, graphics, etc.) over the Internet. The client system 110 may be a remote system accessing the media streams provided by the server system 105. The subsystem 115 is an extensible modular development framework that performs streaming functions using the RTP, the RTCP, payload components and payload interface (e.g., for packetizing and de-packetizing). For example, standalone modules such as RTP module, RTCP module, packetization/de-packetization modules, adaptive jitter buffer (AJB) module, etc. are tied together to form the subsystem 115 with configurability, provided to cater to a vast range of multimedia streaming systems.

The streaming application 120 includes media streams (e.g., non-text files) in the form of RTP packets such as audio, animation, video, images, live streams, etc., transmitted to the client system 110, via the network 125. The media streams thus transmitted can be viewed and/or listened to shortly after downloading process begins, thereby alleviating delay of waiting for entire file to download. The streaming application 120A includes media streams stored in the server system 105 that are to be transmitted via the network 125 and the streaming application 120B includes media streams received by the client system 110 via the network 125. The network 125 enables communication of the media data or RTP packets from the server system 105 to the client system 110.

In various embodiments, the subsystem 115 functions either in a server application or in a client application. In one embodiment, the subsystem 115 can be used in the server mode in applications similar to a streaming server. In another embodiment, the subsystem 115 can be used in the client mode in applications similar to a streaming client. In yet another embodiment, the subsystem 115 can be used in a single application, for example, with one instance as a server and another instance as a client, such as an Internet Protocol Video Phone (IPVP) application. The subsystem 115 can interoperate with standard clients and servers.

In accordance with one or more embodiments described above, multiple standalone modules (e.g., RTP module, RTCP module, packetization/de-packetization module, AJB module, etc.) are developed and tied together to form the subsystem 115 associated with the streaming application 120 and associated with the network 125. In these embodiments, application programming interfaces (APIs) associated with the standalone modules are developed.

Figure 2:
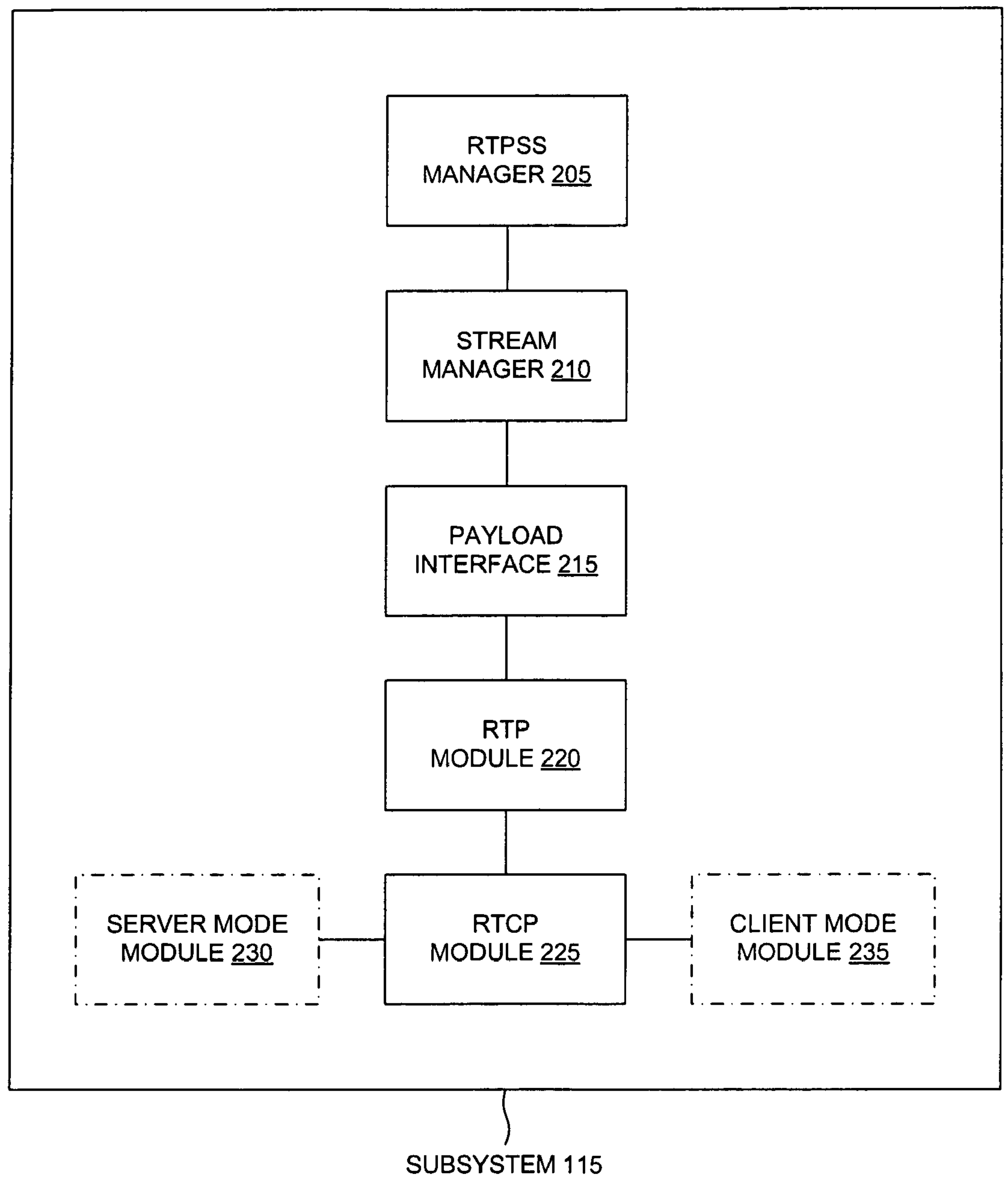
FIG. 2 illustrates major components of the subsystem of FIG. 1, according to one embodiment.

FIG. 2 illustrates major components of the subsystem 115 of FIG. 1, according to one embodiment. Particularly, FIG. 2 illustrates an RTP subsystem (RTPSS) manager 205, a stream manager 210, standalone modules such as a payload interface 215, an RTP module 220 and an RTCP module 225; a server mode module 230 and a client mode module 235.

The RTPSS manager 205 manages a streaming session of one or more media streams. For example, the media streams may include audio stream, video stream, graphics, images, animation, etc. In one embodiment, managing the media streams includes initializing the standalone modules in the subsystem 115. The stream manager 210 manages individual media streams of the streaming session.

In some embodiments, the media streams are added to the stream manager 210 by the RTPSS manager 205. In these embodiments, streaming sessions related to each of audio stream, video stream, etc. (e.g., managed by the stream manager 210) are maintained by the RTPSS manager 205.

The payload interface 215 performs packetization services (e.g., in a server mode) and de-packetization services (e.g., in a client mode) related to media data of the media streams. In some embodiments, the payload interface 215 is coupled to packetization/de-packetization modules implemented as standalone payload components (e.g., performing services related to payload header). In one embodiment, the packetization services include adding of payload specific headers to the media data, if the encoding format of the media stream is supported by the subsystem 115. The RTP module 220 performs RTP services associated with the media data and RTP packets associated with the media streams. For example, the RTP services include adding RTP headers to the media data to form RTP packets.

In some embodiments, the RTP module 220 is configured to add RTP headers to the media data to form RTP packets upon receiving media data (e.g., having associated payload specific headers, if any), even if the encoding format of the media stream is not supported by the subsystem 115. Thus, it can be envisioned that the design of the subsystem 115 is extensible (e.g., such that application specific components could be easily plugged-in to the system) to support addition and use of new components (specifically payload functionalities) transparently and/or support proprietary implementations.

The RTCP module 225 provides RTCP processing associated with the media streams and controls enablement and disablement of the RTCP processing for each media stream. In addition, the RTCP module 225 controls automatic sending and receiving of the RTCP packets for a media stream. The server mode module 230 performs server-mode related services and the client mode module 235 performs client-mode related services. For example, the server mode module 230 includes a server network module and an encryption module, and the client mode module 235 includes an AJB module, a framer, a client network module and a decryption module, which are described in greater detail in FIG. 3 and FIG. 4.

In some embodiments, the standalone modules are integrated in the server system 105 or in the client system 110. The integration of the standalone modules in the subsystem 115 enables reusability of the standalone modules and/or the subsystem 115 associated with the streaming application 120. One can envision that the integrated Further, the subsystem design is modular as the standalone modules can be used independently in any streaming application 120. Also, the subsystem 115 is highly configurable as the streaming application 120 can easily configure features of the standalone modules, thereby making effective use of the standalone modules of the subsystem 115.

In addition, the subsystem design is extensible such that application specific components can be easily plugged-in to the subsystem 115. The modular, reusable and extensible architecture of the subsystem 115 brings down overall system development and/or integration effort (e.g., by 30% to 50%, compared to traditional approaches) in any client or server application. It can be noted that, the implementation of the subsystem 115 in a system design, associated with the client or server application reduces the time to market and enables system designers to focus on application specific development innovation. Implementation of the subsystem 115 in the server mode and the client mode is explained with greater detail in the following description of FIG. 3 and FIG. 4, respectively.

Figure 3:
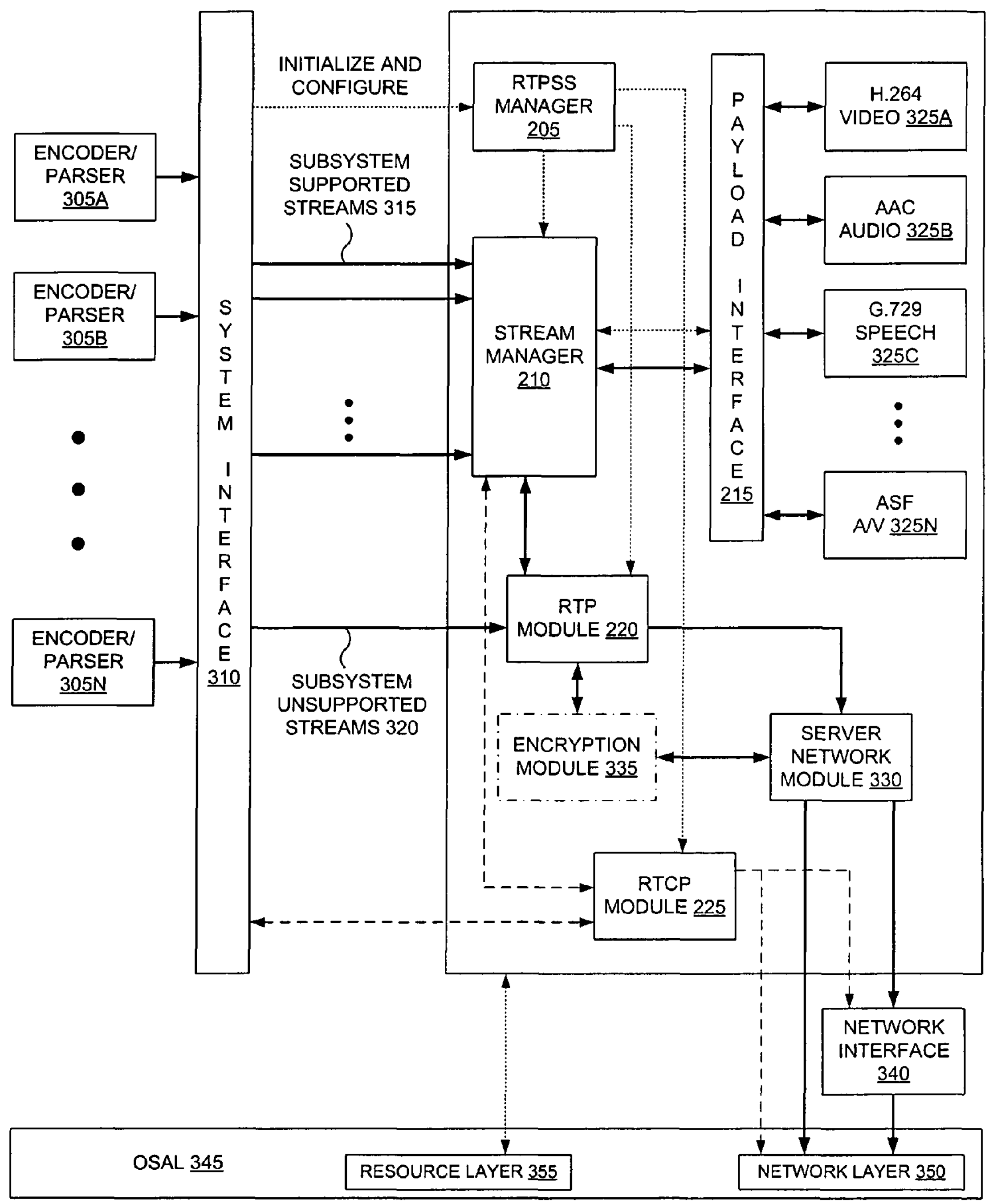
FIG. 3 illustrates implementation of the subsystem in a server mode, according to one embodiment.

FIG. 3 illustrates implementation of the subsystem 115 in the server mode, according to one embodiment. Particularly, FIG. 3 illustrates the subsystem 115, encoders/parsers 305A-N, a system interface 310, a network interface 340 and an operating system abstraction layer (OSAL) 345 including a network layer 350 and a resource layer 355.

The subsystem 115 associated with the streaming application 120A includes standalone modules such as the payload interface 215, the RTP module 220 and the RTCP module 225, in addition to the RTPSS manager 205, the stream manager 210, a server network module 330 and an encryption module 335 of the server mode module 230 to function in the server mode.

In some embodiments, the standalone modules associated with the server mode are tied together and are integrated to form the subsystem 115 associated with the streaming application 120A and further associated with the network 125 such that the subsystem 115 can be used in the streaming application 120A. In these embodiments, the standalone modules are developed with well defined application programming interfaces (APIs), unit tests and validation process. It can be noted that the integration of standalone modules in context of the server mode enables reusability of the standalone modules and the subsystem 115 and also each of the standalone modules can be configured (i.e., to cater a vast range of multimedia streaming systems) and used independently. It can be noted that a significant amount of system software, written during the integration can also be reused. Further, FIG. 3 illustrates data flow path and control path between the various modules in the server context.

In operation, the RTPSS manager 205 manages a streaming session of media streams. In some embodiments, managing the streaming session includes initializing the standalone modules forming the subsystem 115 and maintaining (e.g., detecting SSRC In some embodiments, the stream manager 210 manages individual media streams (e.g., individual audio, video, speech streams, etc.) associated with the streaming session. In these embodiments, the stream manager 210 selects appropriate data flow path within the subsystem 115, based on the encoding format of the individual media stream.

In one embodiment, the stream manager 210 provides the supported streams 315 received from the encoders/parsers 305A-N to the payload interface 215 if the encoding format of the media stream is supported by a system 300 of the server mode. The payload interface 215 associated with the server mode module 230 performs packetization services related to the media data of the supported media streams 315. The payload interface 215 is coupled with packetization modules such as H.264 video 325A, AAC audio 325B, G.729 speech 325C, ASF A/V 325N having codec specific header information such that packetization services are performed on the media stream having H.264 video, AAC audio, G.729 speech, ASF A/V formats (e.g., as illustrated in FIG. 3). One skilled in the art will appreciate that appropriate packetization module can be integrated (e.g., plugged-in) in the subsystem 115, if a new payload format is to be supported by the streaming application 120 without any integration effort to support the new payload format.

The packetization services may include adding payload specific headers to the media data of the supported media stream 315. Upon performing the packetization services related to the media data, the media data having the associated payload specific headers is sent to the RTP module 220 by the stream manager 210. The RTP module 220 then performs RTP services associated with the media data and RTP packets associated with the supported media streams 315. The RTP services include adding of RTP headers to the media data via the RTP module 220 to form RTP packets.

In one embodiment, the payload specific headers and the RTP headers are added by the payload interface 215 (e.g., using the services of the specific payload component 325A-N of FIG. 3) and the RTP module 220 respectively to the media data, if the encoding format of the media stream is supported by the system 300 associated with the server mode. Thus, in case of the supported media streams 315, data flow path (e.g., selected by the stream manager 210) is from the encoder/parser 305 to the payload interface 215 to add the payload specific headers and then to the RTP module 220 to add the RTP headers to the media data of the supported media streams 315 as illustrated in FIG. 3.

In another embodiment, if the encoding format of the media stream is not supported by the subsystem 115, then media data of the unsupported media stream 320 having associated payload specific headers (if any) is received by the RTP module 220 to perform RTP services which include adding of RTP headers to the media data of the unsupported stream 320 to form RTP packets. Thus, in case of the unsupported media streams 320, data flow path associated with each individual media stream is from the encoder/parser 305 to the RTP module 220 to add the RTP headers. Hence, it can be noted that the subsystem 115 designed in the server mode is extensible (e.g., such that application specific components could be easily plugged-in to the subsystem 115) to support addition and use of new components (specifically payload functionalities) transparently and/or support proprietary implementations.

In some embodiments, the RTCP module 225 provides RTCP processing associated with the media streams (e.g., the supported media streams 315, the unsupported media streams 320). In these embodiments, the RTCP module 225 controls enablement and disablement of the RTCP processing for each media stream of the streaming session. The RTCP module 225 may also control automatic sending and receiving of RTCP packets for a media stream of the streaming session. In these embodiments, the subsystem 115 associated with the server mode collects session information and regularly sends the RTCP packets at dynamically calculated intervals (without the need for any intervention from the system 300).

The RTCP module 225 automatically sends the RTCP packets for the media stream either directly to the network layer 350 of the OSAL 345 to deliver to a client application or to the network interface 340 managed by the system 300 such that the RTCP packets to be sent to the client application are delivered to the network layer 350 of the OSAL 345 though the network interface 340.

In one embodiment, the server network module 330 of the server mode module 230 selectively sends the RTP packets (e.g., formed using the RTP module 220) via the network 125. For example, as illustrated in FIG. 3, the server network module 330 sends the RTP packets directly to the network layer 350 of the OSAL 345 to deliver to a client application.

In another embodiment, the server network module 330 may selectively provide the RTP packets to the streaming application 120A to schedule delivery via the network 125, i.e., the server network module 330 may provide the RTP packets to the network interface 340 such that the RTP packets are delivered to the network layer 350 of the OSAL 345 though the network interface 340 which are then forwarded to the client application at a scheduled time by the system 300.

In some embodiments, the encryption module 335 of the subsystem 115 is used to encrypt the RTP packets and/or add proprietary information to the RTP packets. In these embodiments, the encryption module 335 enables plug-in of encryption algorithm modules to encrypt the RTP packets. In one embodiment, the proprietary information may be added to the RTP packets when the delivery of the RTP packets to the client application is scheduled at a later time by the system 300.

It can be noted that the standalone modules described above are tied together to form the subsystem 115 in the server context as data flow between the standalone modules remains same across wide range of streaming applications 120A associated with the server mode. Further, one skilled in the art will realize that tying together of the standalone modules to form a subsystem 115 associated with the server mode ensures reusability of each of the standalone modules as well as the subsystem 115, reduction in system development and/or integration efforts and the time to market. In addition, the above-described subsystem 115 in context of the server mode is modular as the payload interface 215, the RTP module 220, and the RTCP module 225 can be used independently in any streaming application 120A.

The subsystem 115 described in terms of a server context is highly configurable so that the streaming application 120A can easily configure features of the standalone modules and use the standalone modules effectively. Also, implementation of the subsystem 115 associated with the server mode in a system design reduces the time to market and enables system designers to focus on application specific development innovation.

Further, it can be noted that the overall effort required for system development and integration in any server application is reduced significantly (e.g., by about 30% to 50% compared to traditional approaches) since packetization and sending of packets over the network 125 are carried out within the subsystem 115. For example, in the subsystem 115 associated with the server mode, an integration effort needed for a system designer to support new payload format is almost nil. In addition, the above described subsystem 115 enables provision to select the stream manager 210 and session maintenance (e.g., detecting SSRC collision) for RTP streams within the RTP module 220, thereby reducing the system integration effort when the RTP module 220 is used independently as the standalone modules are developed independently with a separate set of APIs.

Figure 4:
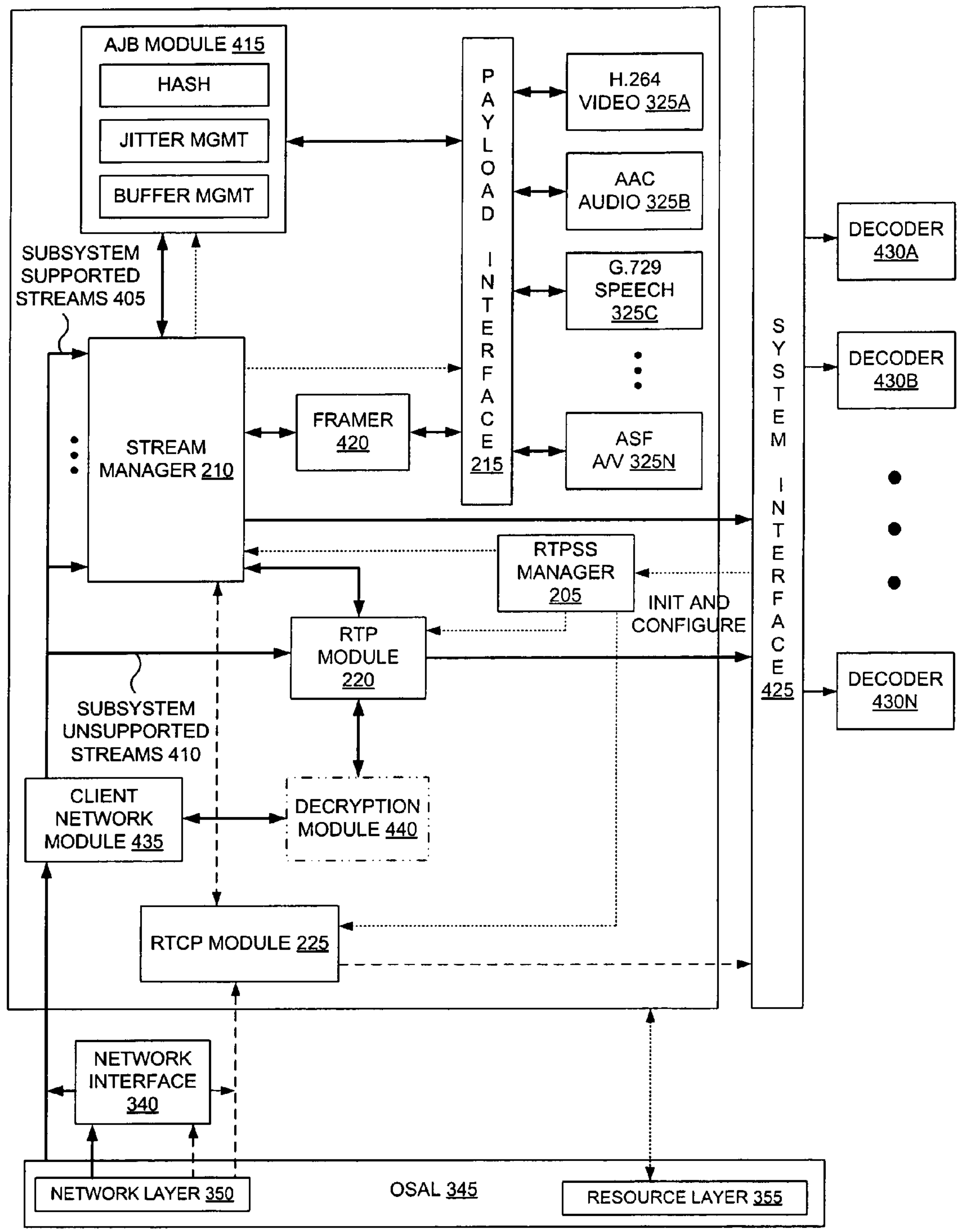
FIG. 4 illustrates implementation of the subsystem in a client mode, according to one embodiment.

FIG. 4 illustrates implementation of the subsystem 115 in a client mode, according to another embodiment. Particularly, FIG. 4 illustrates the subsystem 115, the OSAL 345 including a network layer 350 and a resource layer 355, a network interface 340, a system interface 425 and decoders 430A-N. The subsystem 115 associated with the streaming application 120B includes standalone modules associated with the client mode such as the payload interface 215, the RTP module 220 and the RTCP module 225 in addition to the RTPSS manager 205, the stream manager 210 and an AJB module 415, a framer 420, a client network module 435, a decryption module 440 of the client mode module 235 to function in the client mode.

In some embodiments, the standalone modules associated with the client mode are tied together and are integrated to form the subsystem 115 associated with the streaming application 120B and associated with the network 125 such that, the subsystem 115 can be used in the streaming application 120B. In these embodiments, the standalone modules are developed with well defined APIs, unit tests and validation process. It can be noted that the integration of the standalone modules in context of the client enables reusability of the standalone modules and the subsystem 115 in client applications, and also each of the standalone modules can be configured (i.e., to cater to a vast range of multimedia streaming systems) and used independently. Further, FIG. 4 illustrates a data flow path and a control path between the various modules of the subsystem 115 associated with the client context.

In operation, the RTPSS manager 205 manages overall streaming session of media streams. For example, the media streams include audio stream, video stream, speech stream, etc. In addition, encoding formats associated with the media streams may be H.264 video 325A, AAC audio 325B, G.729 speech 325C, ASF A/V 325N, etc. In some embodiments, managing the streaming session includes initializing the payload interface 215, the RTP module 220 and the RTCP module 225 and maintaining the sessions within each of the individual audio, video or speech streams.

Further, the stream manager 210 manages individual video, audio or speech streams within the streaming session. In some embodiments, media packets of the individual stream are optionally received by the stream manager 210 either through the network interface 340 or directly from the network layer 350 of the OSAL 345. In these embodiments, the individual streams received via the network 125 may include subsystem supported streams 405 or streams 410 unsupported by the subsystem 115 as illustrated in FIG. 4.

In one embodiment, the stream manager 210 directs the media packet of the media stream received over the network 125 to the AJB module 415. The AJB module 415 includes hash, buffer management, jitter management and statistics collection within the subsystem 115 of the client mode. The AJB module 415 inserts the media packets into an AJB in order to buffer, re-order out-of-order packets and/or de-jitter the media packets received over the network 125. In one embodiment, the subsystem 115 can be configured in an auto mode, such that, the media packets are received automatically (e.g., through the client network module 435) and inserted into the AJB.

In some embodiments, the framer module 420 is configured to generate decodable units associated with the media packets of the media stream. A decodable unit is defined as data that can be interpreted by the decoder 430. For example, the decodable unit can be a Network Abstraction Layer (NAL) in case of H.264 video format or a picture for H.263 video format. The decodable unit is generated using the framer module 420 based on the needs of the decoder 430. For example, when the decoder 430 needs a decodable unit, the decodable unit can be generated by making an appropriate call to the subsystem 115 of the client mode. Thus, in the auto mode of the subsystem 115, the streaming application 120B can add a media stream and focus on system design beyond accessing the decodable unit.

In some embodiments, the framer 420 frames the decodable units of the media packets for delivery to the streaming application 120B. In these embodiments, an appropriate decodable unit is delivered to the streaming application 120B based on the encoding format and configuration parameters. For example, the decodable unit is considered as appropriate after collation or de-aggregation of the media packets and satisfying any specific framing or low latency related constraints (e.g., the subsystem 115 of the client mode needs to handle Arbitrary Slice Ordering mode of H.264 video codec in a special manner). In these embodiments, the collation or de-aggregation of the media packets to form the decodable unit is performed within the subsystem 115 based on the encoding format. The appropriate decodable unit is delivered to the decoder 430 through the system interface 425.

The payload interface 215 associated with the client mode performs de-packetization services to de-packetize the media packets using codec specific information. In these embodiments, the payload interface 215 is coupled with de-packetization modules (e.g., having codec specific information) such as H.264 video 325A, AAC audio 325B, G.729 speech 325C, ASF A/V 325N such that de-packetization services are performed on the media packets having H.264 video, AAC audio, G.729 speech, ASF A/V formats (e.g., as illustrated in FIG. 3). One skilled in the art will appreciate that appropriate de-packetization module can be integrated (e.g., plugged-in) in the subsystem 115, if a new payload format is to be supported by the streaming application 120 without any integration effort to support the new payload format.

In another embodiment, the subsystem 115 of the client mode can be configured in a network disable mode. In the network disable mode, the client network module 435 receives RTP packets from the streaming application 120B. In some embodiments, the decryption module 440 of the client mode module 235 decrypts the media packets to form RTP packets and deliver to the subsystem 115. In these embodiments, the decryption module 440 enables plug-in of decryption algorithm modules to decrypt the media packets.

In an alternate embodiment, if the encoding format of the media packets is not supported by a system 400 then the stream manager 210 provides the media packets to the streaming application 120B. Further, in case of the unsupported media packets, the subsystem 115 provides access of the RTP module 220 and the AJB module 415 to the streaming application 120B. In these embodiments, the media packets in the AJB module 415 are provided to the streaming application 120B which then can be provided to the decoder 430 (e.g., after collation or de-aggregation of the media packets). It can thus be noted that new de-packetization modules can be plugged-in to the subsystem 115 with ease.

It can be seen that the standalone modules are tied together to form the subsystem 115 in the client mode as data flow between the standalone modules remains same across wide range of streaming applications. Further, one skilled in the art will realize that tying together of the standalone modules to form the subsystem 115 associated with the client mode ensures reusability of each of the standalone modules as well as the subsystem 115, reduction in system development and/or integration efforts and the time to market. In addition, the above-described subsystem 115 in context of the client mode is modular as the payload interface 215, the RTP module 220, and the RTCP module 225 can be used independently in any streaming application 120B. Also, implementation of the subsystem 115 associated with the client mode in a system design reduces the time to market and enables system designers to focus on application specific development innovation.

It can also be noted that overall effort required for system development and/or integration in any client application is reduced significantly (e.g., by about 30% to 50% compared to traditional approaches) since receiving, de-packetization of the media packets, re-ordering, jitter management, and other functionalities are carried out within the subsystem 115 of the client mode. For example, in the subsystem 115 associated with the client mode, an integration effort needed for a system designer to support new payload format is almost nil.

Figure 5:
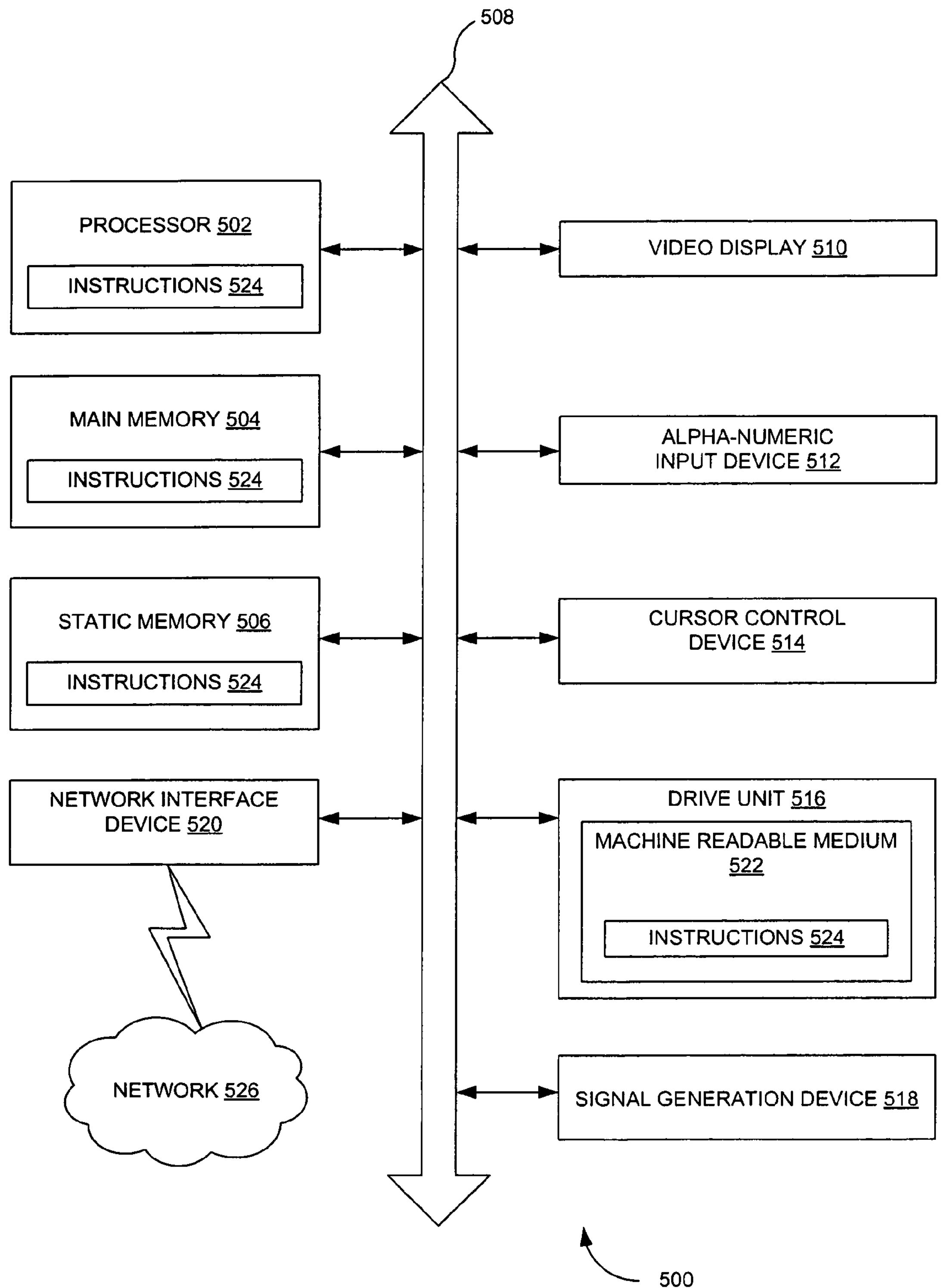
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a BIOS and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

For example, a storage medium having instructions, that when executed by a computing platform, results in execution of a method of providing a subsystem 115 associated with a streaming application 120, including developing multiple standalone modules, developing application programming interfaces associated with the standalone modules, and tying together the standalone modules to form the subsystem 115 associated with the streaming application 120 and associated with the network 125.

The subsystem 115 includes modules such as an RTPSS manager 205 to manage a streaming session of media streams, a stream manager 210 to manage individual media streams, a payload interface 215 to perform packetization services or de-packetization services related to media data of the media streams, an RTP module 220 to perform RTP services associated with the media data and/or RTP packets associated with the media streams, an RTCP module 225 to provide RTCP processing associated with the media streams, to control enablement and disablement of the RTCP processing for each media stream of the streaming session and to control automatic sending and receiving of the RTCP packets for a media stream of the streaming session, and a server mode module 230 to perform server-mode related services or a client mode module 235 to perform client-mode related services.

Figure 6A:
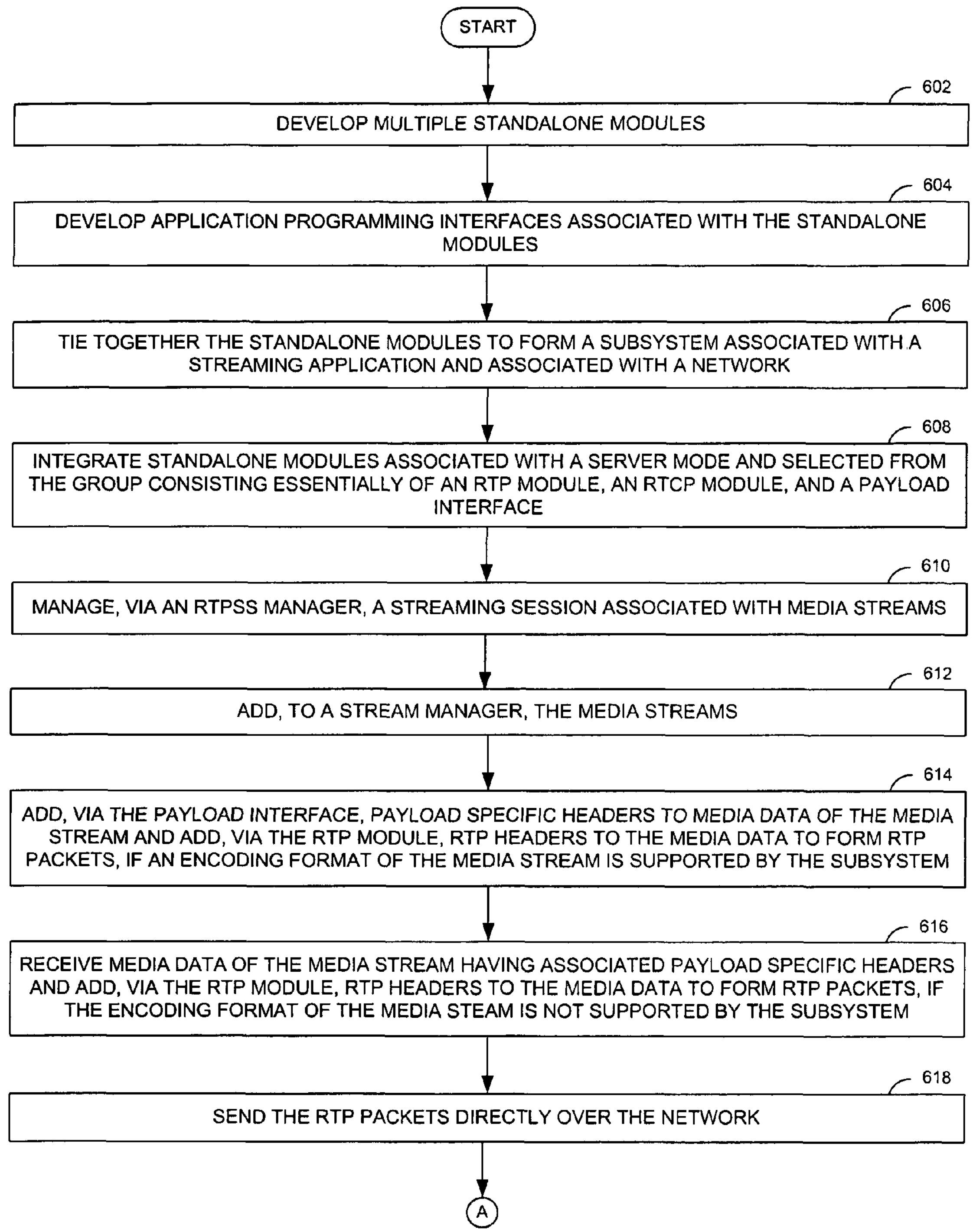
FIG. 6A is a process flow of developing, integrating and implementing a subsystem having standalone modules for use in server/client applications, according to one embodiment.

FIG. 6A is a process flow of developing, integrating and implementing a subsystem 115 having standalone modules for use in server/client applications, according to one embodiment. In operation 602, the multiple standalone modules are developed. In operation 604, application programming interfaces associated with the standalone modules are developed. In operation 606, the standalone modules are tied together to form the subsystem 115 associated with the streaming application 120 and associated with the network 125. In the following description, operations 608-630 illustrate implementation of the subsystem 115 having the standalone modules in a server mode. In operation 608, the standalone modules including an RTP module 220, an RTCP module 225, and a payload interface 215, associated with the server mode are integrated.

In operation 610, a streaming session associated with media streams is managed via an RTPSS manager 205. In operation 612, the media streams are added to a stream manager 210. Operations 614 and 616 are performed to form RTP packets through adding RTP headers, when the media stream is supported and unsupported by the subsystem 115 respectively. In operation 614, payload specific headers are added to media data of the media stream, via the payload interface 215, and RTP headers are added to the media data to form RTP packets, via the RTP module 220, if an encoding format of the media stream is supported by the subsystem 115. In operation 616, media data of the media stream having associated payload specific headers are received and RTP headers are added to the media data to form RTP packets, via the RTP module 220, if the encoding format of the media stream is not supported by the subsystem 115. In operation 618, RTP packets are sent directly over the network 125.

Figure 6B:
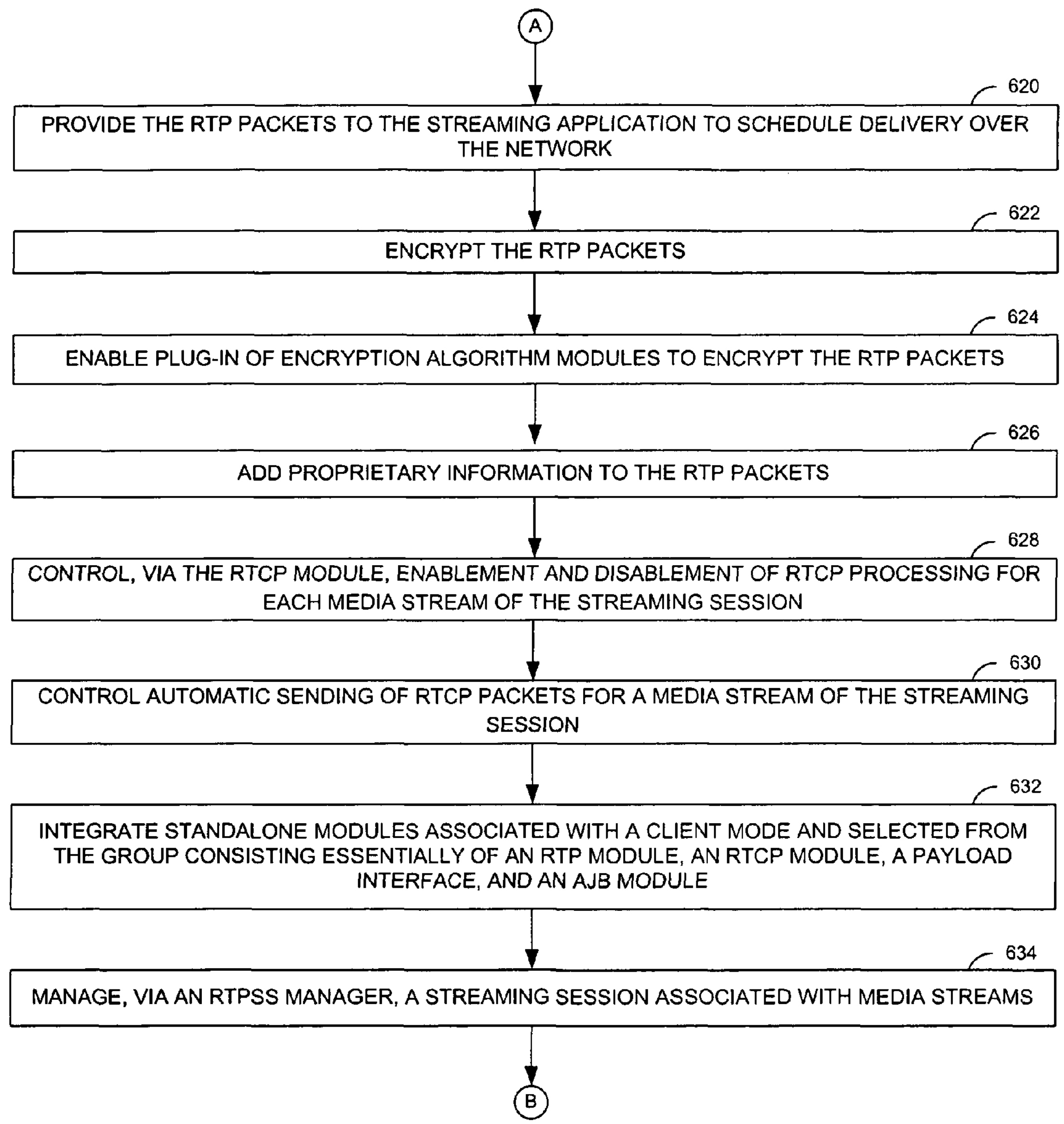
FIG. 6B is a continuation of the process flow of FIG. 6A, illustrating additional processes, according to one embodiment.

FIG. 6B is a continuation of the process flow of FIG. 6A, illustrating additional processes, according to one embodiment. In operation 620, the RTP packets are provided to the streaming application 120 to schedule delivery over the network 125. In operation 622, the RTP packets are encrypted. In operation 624, plug-in of encryption algorithm modules to encrypt the RTP packets are enabled. In operation 626, proprietary information is added to the RTP packets. It can be noted that, operation 626 is performed in case delivery of the RTP packets over the network 125 is to be scheduled at a later time.

In operation 628, enablement and disablement of RTCP processing for each media stream of the streaming session is controlled, via the RTCP module 225. In operation 630, automatic sending of RTCP packets for a media stream of the streaming session is controlled. Implementation of the subsystem 115 in a client mode is described in following operations 632-650. In operation 632, standalone modules including the RTP module 220, the RTCP module 225, the payload interface 215, and the AJB module 415 associated with the client mode are integrated. In operation 634, a streaming session associated with media streams is managed, via the RTPSS manager 205.

Figure 6C:
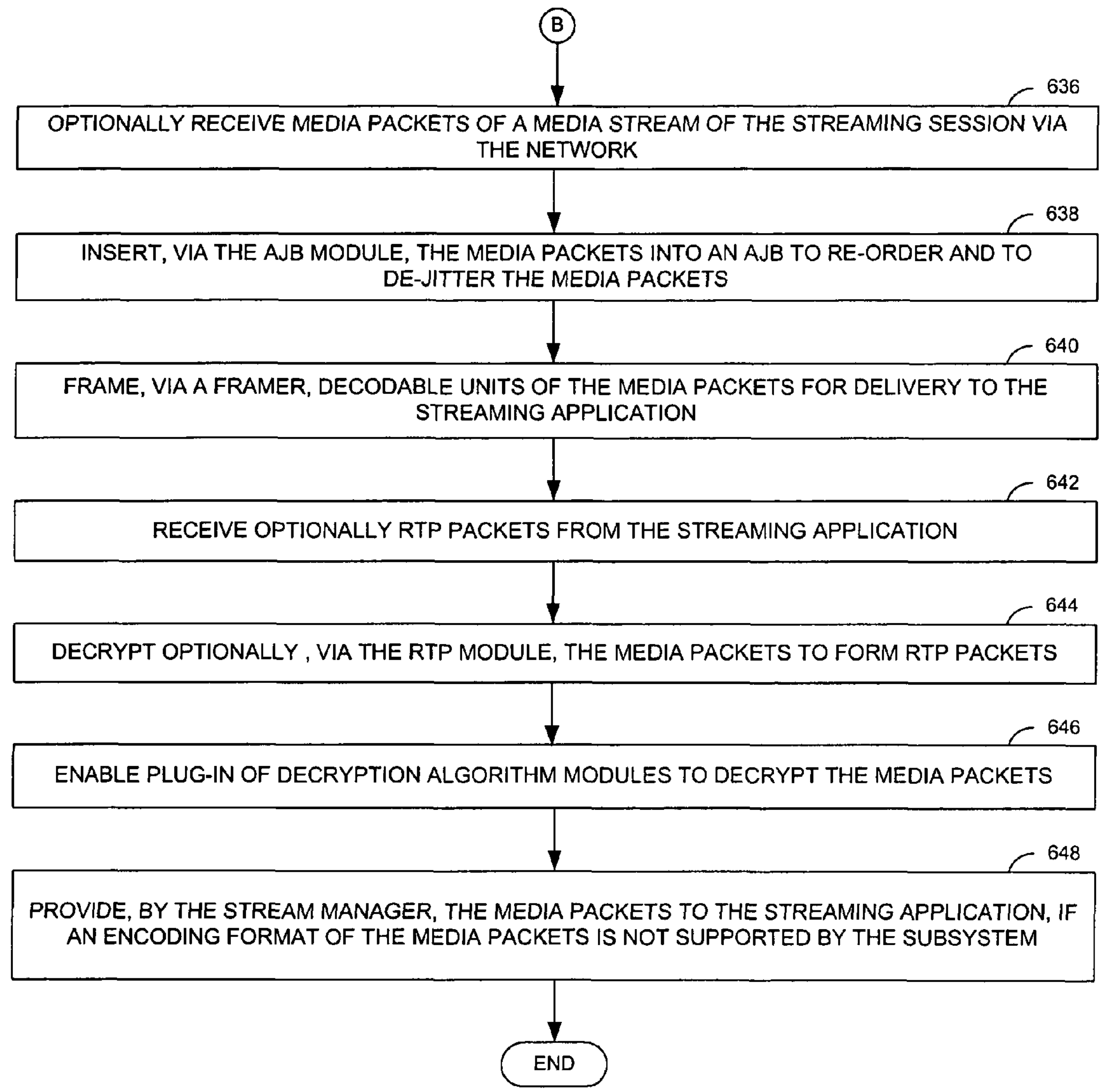
FIG. 6C is a continuation of the process flow of FIG. 6B, illustrating additional processes, according to one embodiment.

FIG. 6C is a continuation of the process flow of FIG. 6B, illustrating additional processes, according to one embodiment. In operation 636, media packets of a media stream of the streaming session are optionally received via the network 125. In operation 638, the media packets are inserted into an AJB, via the AJB module 415 to re-order and to de-jitter the media packets. In operation 640, decodable units of the media packets are framed, via a framer 420, for delivery to the streaming application 120B.

In operation 642, RTP packets are optionally received from the streaming application 120. In operation 644, the media packets are optionally decrypted, via the RTP module 220, to form RTP packets. In operation 646, plug-in of decryption algorithm modules is enabled to decrypt the media packets. It can be noted that the process 600 performs operations 644 and 646, if the media packets are to be decrypted. In operation 648, the media packets are provided by the stream manager 210 to the streaming application 120B, if an encoding format of the media packets is not supported by the subsystem 115.

The above-described technique reduces overall system development and/or integration effort by significant amount (e.g., 30% to 50% compared to traditional approaches) and hence reduces the time to market. For example, the above-described system enables integration of appropriate packetization and de-packetization modules into a subsystem (e.g., the subsystem 115) when a new payload format has to be supported by a streaming application (e.g., the streaming application 120 of FIG. 1) without any integration effort needed for system designers to support the new payload format. Also, the above-described system reduces the system integration effort when an RTP module (e.g., the RTP module 220 of FIG. 2) is used independently (e.g., as the standalone modules are developed independently with a separate set of APIs) by enabling choice of provision of a stream manager (e.g., the stream manager 210 of FIG. 2) and session maintenance for RTP streams within the RTP module. In addition, it can be noted that, implementation of the subsystem in a system design associated with the client or server application reduces the time to market and enables system designers to focus on application specific development innovation.

Further, the above-described subsystem facilitates configuring (e.g., adding, removing) various modules at a build time for program or code memory optimization. The inclusion of each module is determinable at build time for any system. For example, if the subsystem is to be used only in a server context, then components like the AJB module can be removed at the time of build (e.g., as illustrated in FIG. 3). Also, in case H.264 video is not needed, then it is possible to remove H.264 payload module at the time of build. This enables tailoring code size of the subsystem to suit the target application.

In addition, the above described subsystem in the server and client context provides a variety of input options in terms of buffer ownership and modes of operation as the subsystem can be implemented in a wide range of multimedia applications. For example, each encoder/decoder is capable of specifying its output buffers and the format in which the media data is placed. Thus, the subsystem illustrated in FIGS. 3 and 4 can directly write off the data based on appropriate parameter settings during initialization, thereby reducing expensive memory copy and/or data movement within the subsystem.

Moreover, the above-described subsystem includes interoperability with standard system and has an elaborate testing process. This helps in enabling the systems to leverage testing process and/or time which can bring down significant efforts in system testing cycle.

Also, the method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of configuring standalone modules for enabling various multimedia streaming applications, comprising:

developing multiple standalone modules;

developing application programming interfaces associated with the multiple standalone modules; and integrating the multiple standalone modules selected from the group consisting of an RTP (real-time transport protocol) module, an RTCP (RTP control protocol) module, a payload interface, and an AJB (adaptive jitter buffer) module to form a subsystem associated with a network, wherein the subsystem is implemented in at least one of a server mode and a client mode to handle multiple media streams, wherein the subsystem is extensible such that application specific components can be plugged-in to the subsystem to support addition and use of new payload formats using the payload interface, wherein supporting the new payload formats using the payload interface comprises:

adding, to a stream manager, the media streams;

for each media stream of a streaming session in the server mode:

adding, via the payload interface, payload specific headers to media data of the media stream and adding, via the RTP module, RTP headers to the media data to form RTP packets, if an encoding format of the media stream is supported by the subsystem; and receiving media data of the media stream having associated payload specific headers and adding, via the RTP module, RTP headers to the media data to form RTP packets, if the encoding format of the media stream is not supported by the subsystem; and for each media stream of a streaming session in the client mode:

inserting, via the AJB module, media packets into an AJB to re-order and to de-jitter the media packets; and framing, via a framer, decodable units by collation or de-aggregation of the media packets for delivery to a streaming application, wherein integrating the multiple standalone modules enables reusability of each standalone module and the subsystem, and wherein each of the standalone modules in the subsystem is configured to cater the various multimedia streaming applications.

2. The method of claim 1, further comprising:

integrating standalone modules associated with the server mode and selected from the group consisting of the RTP module, the RTCP module, and the payload interface; and managing, via an RTPSS (RTP subsystem) manager, the streaming session associated with the media streams.

3. The method of claim 1, further comprising:

sending the RTP packets directly over the network.

4. The method of claim 1, further comprising:
providing the RTP packets to the streaming application to schedule delivery over the network.

5. The method of claim 1, further comprising:
encrypting the RTP packets;
enabling plug-in of encryption algorithm modules to encrypt the RTP packets; and
adding proprietary information to the RTP packets.

6. The method of claim 1, further comprising:
controlling, via the RTCP module, enablement and disablement of RTCP processing for each media stream of the streaming session; and
controlling automatic sending of RTCP packets for a media stream of the streaming session.

7. The method of claim 1, further comprising:
integrating standalone modules associated with the client mode and selected from the group consisting of the RTP module, the RTCP module, the payload interface, and the AJB module;
managing, via an RTPSS manager, the streaming session associated with the media streams; and
optionally receiving media packets of a media stream of the streaming session via the network.

8. The method of claim 7, further comprising:
optionally receiving RTP packets from the streaming application; and
optionally decrypting, via the RTP module, the media packets to form RTP packets.

9. The method of claim 8, further comprising:
enabling plug-in of decryption algorithm modules to decrypt the media packets.

10. The method of claim 7, further comprising:
providing, by the stream manager, the media packets to the streaming application, if an encoding format of the media packets is not supported by the subsystem.

11. A subsystem for configuring standalone modules for enabling various multimedia streaming applications, comprising:
an RTPSS manager to manage a streaming session of media streams;
a stream manager to manage individual media streams of the streaming session and to provide the media packets to the streaming application, if an encoding format of the media packets is not supported by the subsystem;
a payload interface to perform at least one element selected from the group consisting of packetization services and de-packetization services related to media data of the media streams;
an RTP module to perform RTP services associated with at least one element selected from the group consisting of the media data and RTP packets associated with the media streams;
an RTCP module to provide RTCP processing associated with the media streams, to control enablement and disablement of the RTCP processing for each media stream of the streaming session and to control automatic sending and receiving of the RTCP packets for a media stream of the streaming session; and
at least one element selected from the group consisting of a server mode module to perform server-mode related services and a client mode module to perform client-mode related services, wherein the RTPSS manager, the stream manager, the payload interface, the RTP module, the RTCP module, the server mode module, and the client module in the subsystem are configured to cater the various multimedia streaming applications, wherein integrating the multiple standalone modules enables reusability of each standalone module and the subsystem, wherein the subsystem is extensible such that application specific components can be plugged-in to the subsystem to support addition and use of new payload formats using the payload interface, wherein the payload interface performs the packetization services for each media stream of a streaming session in the server mode comprising:
adding payload specific headers to the media data of the media stream and adding RTP headers to the media data to form RTP packets, if an encoding format of the media stream is supported by the subsystem; and
receiving media data of the media stream having associated payload specific headers and adding RTP headers to the media data to form RTP packets, if the encoding format of the media stream is not supported by the subsystem,
and wherein the payload interface performs the de-packetization services in the client mode comprising:
inserting, via an AJB module, the media packets into an AJB to re-order and de jitter the media packets received over a network; and
generating and framing, via a framer, decodable units by collation or de-aggregation of the media packets for delivery to the streaming application based on the encoding format and configuration parameters.

12. The system of claim 11, wherein the server mode module further comprises at least one element selected from the group consisting of:
a server network module to selectively send the RTP packets via a network and to selectively provide the RTP packets to a streaming application to schedule delivery via the network; and
an encryption module to encrypt the RTP packets, to enable plug-in of encryption algorithm modules to encrypt the RTP packets, and to add proprietary information to the RTP packets.

13. The system of claim 11, wherein the client mode module further comprises at least one element selected from the group consisting of:
a client network module to optionally receive the RTP packets via the network and to optionally receive the RTP packets from the streaming application;
a decryption module to decrypt the media packets to form RTP packets and enable plug-in of decryption algorithm modules to decrypt the media packets.

14. An article, comprising:
a non transitory computer readable storage medium having instructions, that when executed by a computing platform, result in execution of a method of configuring standalone modules for enabling various multimedia streaming applications, comprising:
developing multiple standalone modules;
developing application programming interfaces associated with the multiple standalone modules; and
integrating the multiple standalone modules selected from the group consisting of an RTP (real-time transport protocol) module, an RTCP (RTP control protocol) module, a payload interface, and an AJB (adaptive jitter buffer) module to form a subsystem associated with a network, wherein the subsystem is implemented in at least one of a server mode and a client mode to handle multiple media streams, wherein the subsystem is extensible such that application specific components can be plugged-in to the subsystem to support addition and use of new payload formats using the payload interface, wherein supporting the new payload formats using the payload interface comprises:

adding, to a stream manager, the media streams;

for each media stream of a streaming session in the server mode:

adding, via the payload interface, payload specific headers to media data of the media stream and adding, via the RTP module, RTP headers to the media data to form RTP packets, if an encoding format of the media stream is supported by the subsystem; and receiving media data of the media stream having associated payload specific headers and adding, via the RTP module, RTP headers to the media data to form RTP packets, if the encoding format of the media stream is not supported by the subsystem; and for each media stream of a streaming session in the client mode:

inserting, via the AJB module, media packets into an AJB to re-order and to de-jitter the media packets; and framing, via a framer, decodable units by collation or de-aggregation of the media packets for delivery to a streaming application, wherein integrating the multiple standalone modules enables reusability of each standalone module and the subsystem, and wherein each of the standalone modules in the subsystem is configured to cater the various multimedia streaming applications.

15. The article of claim 14, wherein the subsystem comprises modules selected from the group consisting of:

an RTPSS manager to manage a streaming session of the media streams;

a stream manager to manage individual media streams of the streaming session and to provide the media packets to the streaming application, if the encoding format of the media packets is not supported by the subsystem;

wherein the payload interface performs at least one element selected from the group consisting of packetization services and de-packetization services related to the media data of the media streams;

wherein the RTP module performs RTP services associated with at least one element selected from the group consisting of the media data and RTP packets associated with the media streams; and wherein the RTCP module provides RTCP processing associated with the media streams, to control enablement and disablement of the RTCP processing for each media stream of the streaming session and to control automatic sending and receiving of the RTCP packets for a media stream of the streaming session.

* * * * *